(12) United States Patent
Maalioune et al.

(10) Patent No.: US 9,587,584 B2
(45) Date of Patent: Mar. 7, 2017

(54) THRUST-REVERSAL DEVICE FOR AN AIRCRAFT INCLUDING AT LEAST TWO THRUST REVERSERS

(71) Applicant: AIRCELLE, Gonfreville l'Orcher (FR)

(72) Inventors: Hakim Maalioune, Orgeval (FR); Alain Nourrisson, Orgeval (FR)

(73) Assignee: AIRCELLE, Gonfreville L'Orcher (FR)

( * ) Notice: Subject to any disclaimer, the term of this patent is extended or adjusted under 35 U.S.C. 154(b) by 97 days.

(21) Appl. No.: 14/578,110

(22) Filed: Dec. 19, 2014

(65) Prior Publication Data

US 2015/0137725 A1 May 21, 2015

Related U.S. Application Data

(63) Continuation of application No. PCT/FR2013/051507, filed on Jun. 27, 2013.

(30) Foreign Application Priority Data

Jun. 28, 2012 (FR) ...................... 12 56155

(51) Int. Cl.
*H02P 7/06* (2006.01)
*F02K 1/76* (2006.01)
(Continued)

(52) U.S. Cl.
CPC .............. *F02K 1/763* (2013.01); *B64D 33/04* (2013.01); *B64D 41/00* (2013.01); *F02K 1/76* (2013.01); *H02P 7/06* (2013.01); *B64D 2221/00* (2013.01); *F05D 2260/901* (2013.01); *F05D 2270/62* (2013.01); *Y02T 50/44* (2013.01); *Y02T 50/671* (2013.01)

(58) Field of Classification Search
CPC ........................................................ H02P 7/06
USPC ........................................ 318/504, 494, 3
See application file for complete search history.

(56) References Cited

U.S. PATENT DOCUMENTS

| 4,827,248 A * | 5/1989 | Crudden ................. F02K 1/766 244/110 B |
| 6,525,951 B1 * | 2/2003 | Paice ...................... H02M 5/14 363/153 |

(Continued)

FOREIGN PATENT DOCUMENTS

| EP | 1 555 745 A1 | 7/2005 |
| EP | 2 236 413 A2 | 10/2010 |

OTHER PUBLICATIONS

International Search Report issued Oct. 18, 2013 in International Application No. PCT/FR2013/051507.

*Primary Examiner* — David S Luo
(74) *Attorney, Agent, or Firm* — Burris Law, PLLC

(57) ABSTRACT

A thrust reverser device for an aircraft includes at least two thrust reversers, and each of them includes a movable cowl movably actuated by an actuator driven by an electric motor. The electric motor is powered by a single power-conversion module including at least one autotransformer which is supplied with an alternating electric voltage and connected to at least one rectifier stage converting the alternating electric voltage into a direct voltage. The rectifier stage is connected to a current balancing stage and a current smoothing stage, supplying with the direct voltage the electric motor of the electric actuator of the movable cowl.

6 Claims, 3 Drawing Sheets

Figure 1:
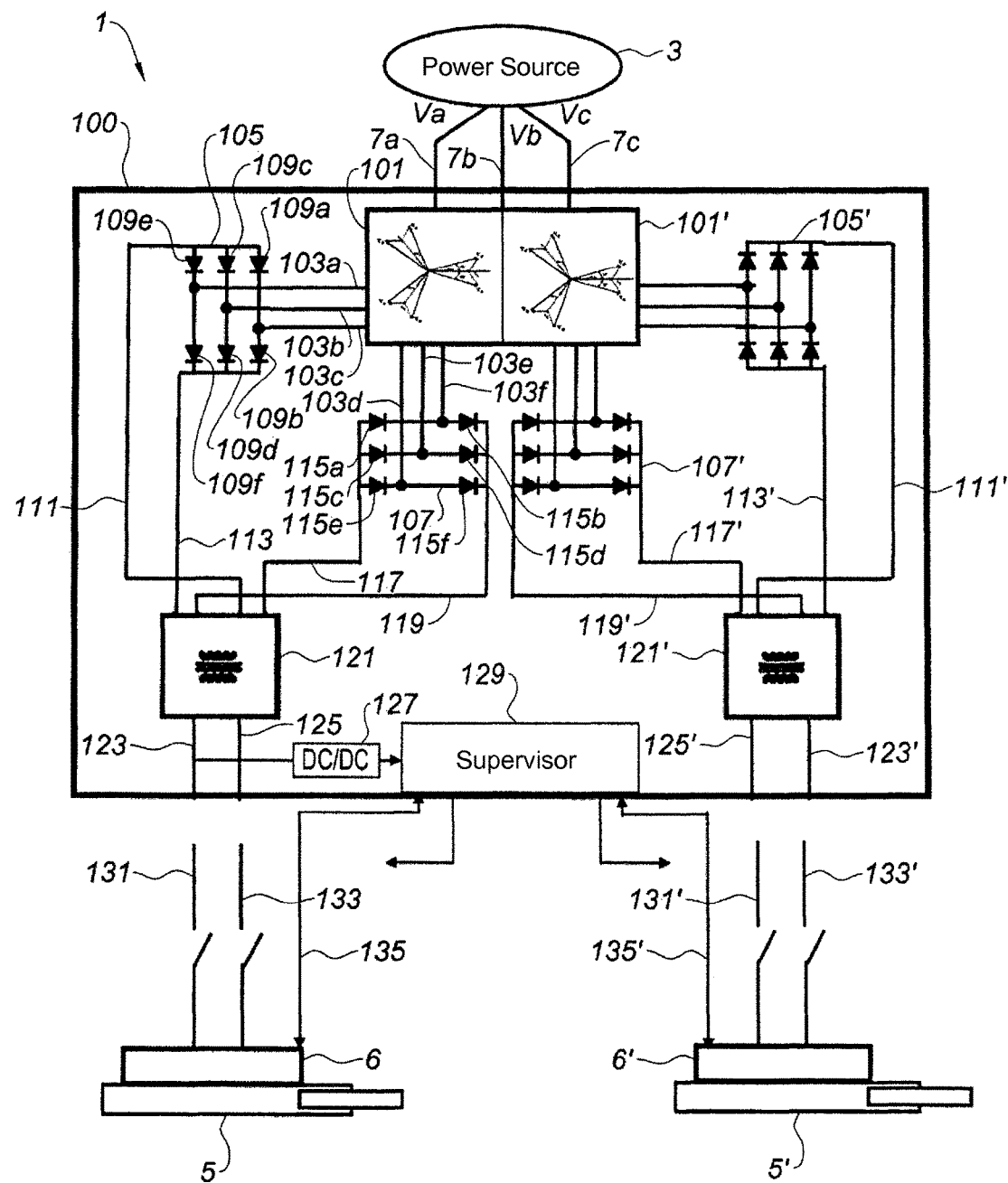

(51) Int. Cl.
*B64D 41/00* (2006.01)
*B64D 33/04* (2006.01)

(56) References Cited

U.S. PATENT DOCUMENTS

| | | | | |
|---|---|---|---|---|
| 7,277,302 B2* | 10/2007 | Gazel | ...................... | H02M 7/08 |
| | | | | 363/154 |
| 7,409,820 B2* | 8/2008 | Ahrendt | .................... | F02K 1/72 |
| | | | | 244/110 B |
| 2011/0273010 A1 | 11/2011 | Tardy | | |
| 2012/0104160 A1 | 5/2012 | Baumann | | |

* cited by examiner

THRUST-REVERSAL DEVICE FOR AN AIRCRAFT INCLUDING AT LEAST TWO THRUST REVERSERS

CROSS-REFERENCE TO RELATED APPLICATIONS

This application is a continuation of International Application No. PCT/FR2013/051507, filed on Jun. 27, 2013, which claims the benefit of FR 12/56155, filed on Jun. 28, 2012. The disclosures of the above applications are incorporated herein by reference.

FIELD

The present disclosure relates to a thrust reverser device for an aircraft comprising at least two thrust reversers.

BACKGROUND

The statements in this section merely provide background information related to the present disclosure and may not constitute prior art.

An aircraft is propelled by a plurality of turbojet engines each housed in a nacelle that also accommodates a set of complementary devices related to its operation such as a thrust reverser device.

The role of a thrust reverser during landing of an aircraft is to improve its braking ability by redirecting forward at least a part of the thrust generated by the turbojet engine.

In this phase, the thrust reverser obstructs the gas ejection nozzle and directs the ejection flow of the engine to the front of the nacelle thereby generating a counter-thrust which adds to the braking of the wheels of the aircraft.

The means implemented to achieve this flow reorientation vary depending on the thrust reverser type. Regardless of the type of reverser, the structure of a thrust reverser comprises movable cowls displaceable between an opening position in which they open a passage within the nacelle intended for the diverted flow and a closing position in which they close this passage.

These movable cowls may fulfill by themselves the function of deflection or simply a function of actuation of other diverting means such as flaps of obstruction of the flow path.

The actuation of the thrust reverser, thus the displacement the movable cowl, is controlled according to prior art by hydraulic or pneumatic cylinders which require a network of transportation of pressurized fluid.

This pressurized fluid is conventionally obtained either by air tapping on the turbojet engine in the case of a pneumatic system or by picking upon the hydraulic circuit of the aircraft in the case of a hydraulic system.

The necessity for complex equipment for allowing air or fluid picking up, and the network of hydraulic or pneumatic transportation, significantly make the aircraft heavier.

Moreover, such systems require a significant maintenance because the slightest leakage in the hydraulic or pneumatic network may have harmful consequences on the thrust reverser as well as on other parts of the nacelle.

To overcome these drawbacks, the thrust reverser manufacturers have sought to replace them with electric actuation systems.

Each thrust reverser is supplied with electrical energy by a power source of the aircraft. Each of the power sources is connected to a power-conversion module providing the conversion from the alternating voltage delivered by the power source into a direct voltage.

A first drawback of this type of architecture is related to the number of power lines necessary for the operation of the actuation systems of the thrust reversers, the aircraft generally offering only a limited number of power lines.

A second drawback comes from the fact that the actuation systems of the thrust reversers are segregated. Indeed, when the various thrust reversers do not deploy simultaneously or when only one thrust reverser is deployed, it is up to the pilot to check that the non-deployed thrust reverser has a minimum thrust on the corresponding turbojet engine.

The patent application EP 2 236 413 known from the prior art refers to an aircraft source supplying a power-conversion module that distributes the power supply to a plurality of actuators.

However, such an electrical architecture is adapted for actuators that can be sequentially supplied but is not conformed for a use specific to the actuators of thrust reversers to be supplied at the same time with minimum power dissymmetry between each actuator.

SUMMARY

The present disclosure provides a thrust reverser device for an aircraft comprising at least two thrust reversers, each of said thrust reversers comprising at least one cowl movably mounted between a closing position and an opening position, said cowl being actuated by at least one actuator able to be driven by at least one electric motor, said electric motors being electrically supplied by a single power-conversion module electrically supplied by a single power source of said aircraft, said device being remarkable in that the power-conversion module comprises at least one autotransformer supplied with an alternating electric voltage by the power source of said aircraft and connected to at least one rectifier stage adapted for converting said alternating voltage into direct voltage, said rectifier stage being connected to a current balancing stage and/or to a current smoothing stage, adapted for supplying with direct voltage said electric motor of said actuator of said cowl of the thrust reverser.

Thus, by providing a single power-conversion module adapted for electrically supplying the actuators of each thrust reverser, the power supply of said module is carried out by a single power source of the network of the aircraft, which allows limiting the number of power sources necessary to the power supply of the actuators while limiting the current harmonics on this power source of the aircraft network.

Moreover, by gathering in a single module all the components necessary to supply all the actuators of the thrust reversers, the thrust reverser device is simplified.

According to a first form, the power-conversion module comprises two autotransformers, each being supplied with alternating electric voltage by said power source of said aircraft, each of said autotransformers comprising phase-shifted outputs and connected to at least two rectifier circuits, each of said rectifier circuits of a same autotransformer being connected to a single interphase inductor at least adapted for balancing the currents and delivering a direct voltage supplying at least one electric motor of an actuator of the cowl of a thrust reverser.

According to a second form, the power-conversion module comprises two autotransformers supplied with an alternating electric voltage by said power source of said aircraft, and each of said autotransformers comprising phase-shifted outputs and connected to at least one rectifier circuit, each of said rectifier circuits of a same autotransformer being connected to a coupled DC inductor at least adapted for smoothing the current and delivering a direct voltage supplying at least one electric motor of an actuator of the cowl of a thrust reverser.

Thus, according to this form of the present disclosure, the power-conversion module comprises a total of two rectifier circuits, thereby significantly reducing the weight of the set relative to the first form.

In a third form, the power-conversion module comprises a single autotransformer supplied with alternating electric voltage by said power source of said aircraft, said autotransformer comprising two phase-shifted outputs connected to at least two rectifier circuits, each of said rectifier circuits being connected to a coupled DC inductor at least adapted for smoothing the current and delivering a direct voltage supplying at least one electric motor of an actuator of the cowl of a thrust reverser.

Thanks to this third form, the weight of the power-conversion module is substantially reduced in that it comprises a single autotransformer.

According to one form, at least one rectifier circuit of the power-conversion module comprises a diode bridge comprising at least six diodes.

According to another form of the present disclosure, the power-conversion module further comprises at least one supervisor adapted for monitoring and controlling the actuators of the cowls of said thrust reversers, said supervisor being supplied with direct voltage by said inductors.

Further areas of applicability will become apparent from the description provided herein. It should be understood that the description and specific examples are intended for purposes of illustration only and are not intended to limit the scope of the present disclosure.

DRAWINGS

Figure 2:
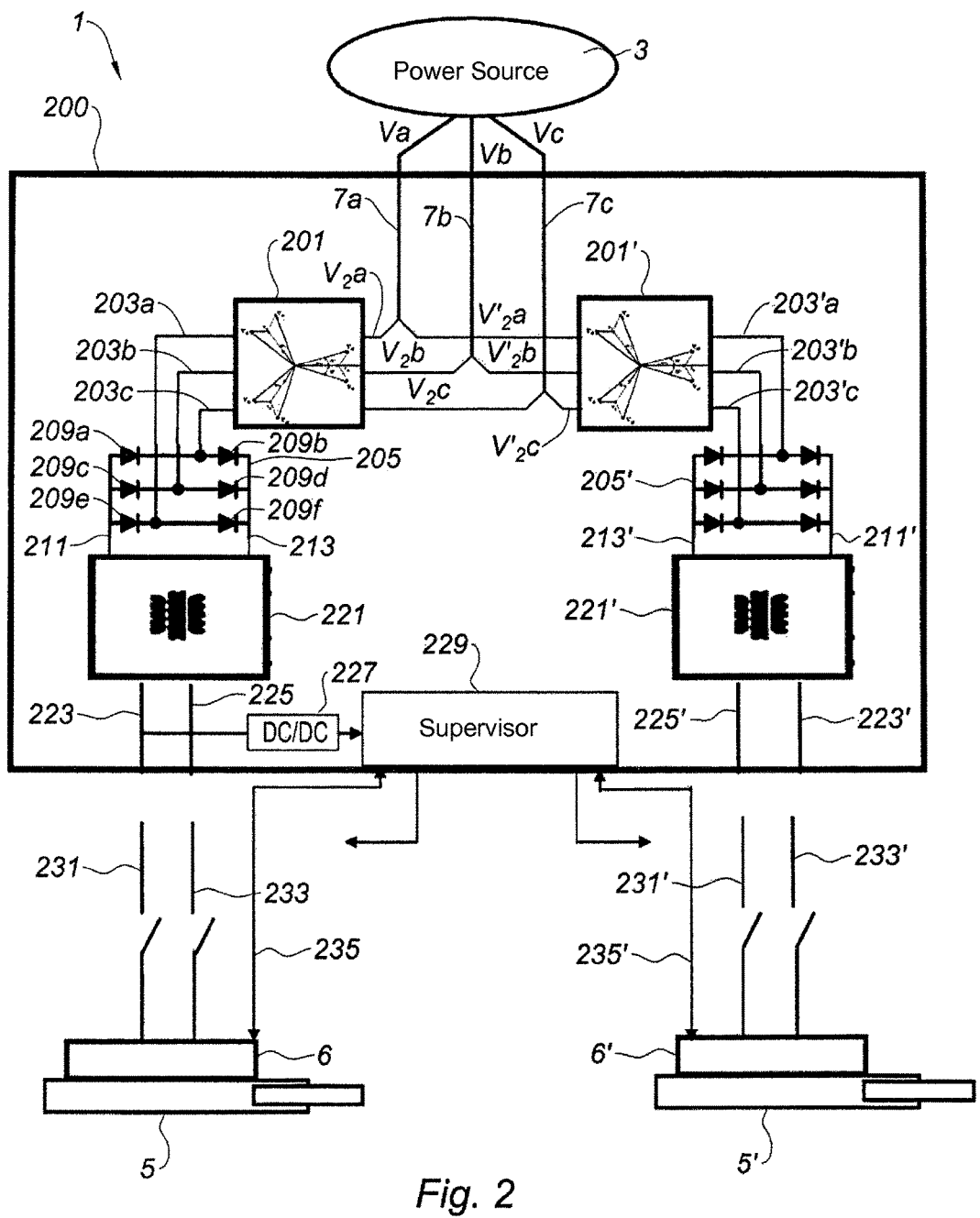
Figure 3:
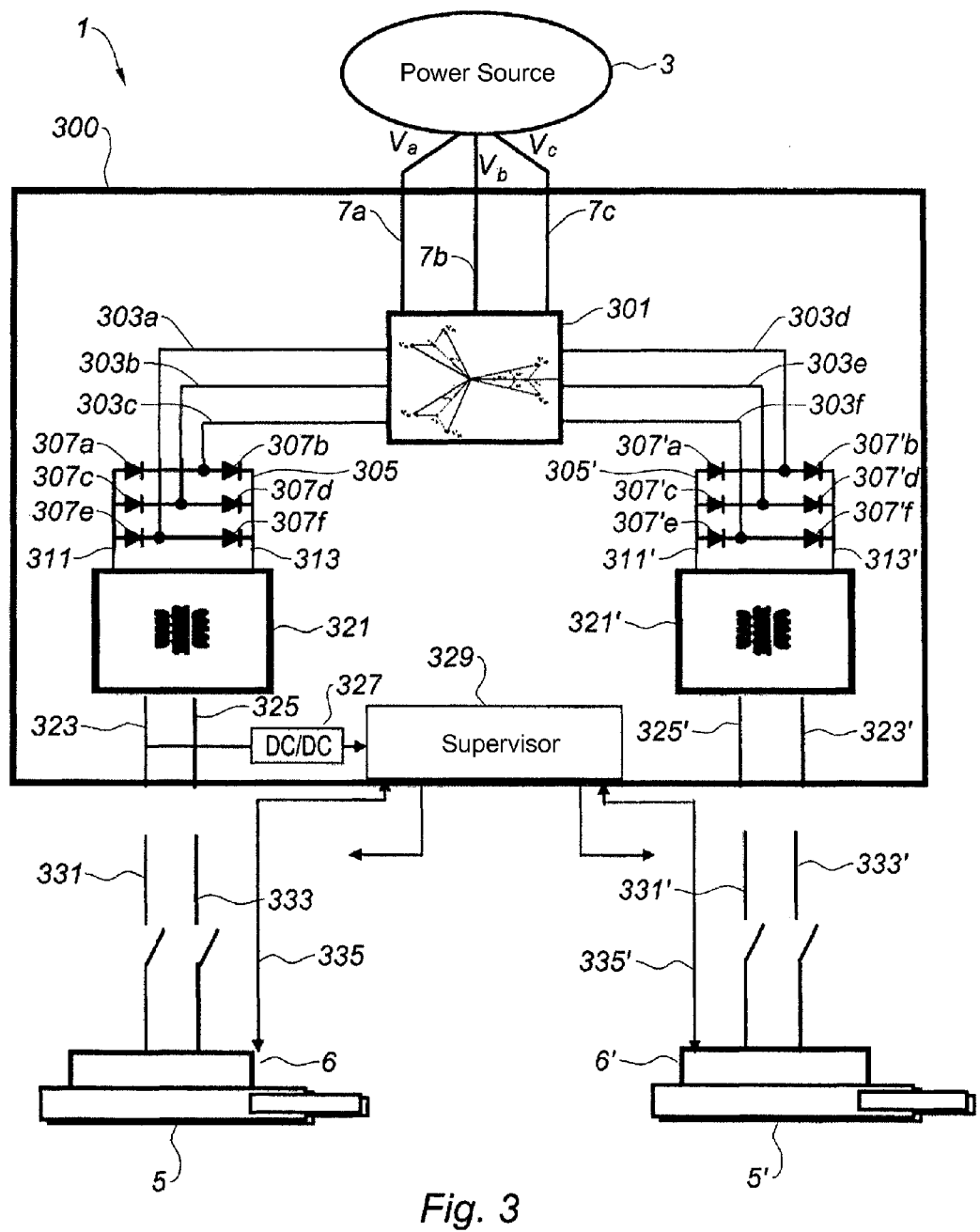

In order that the disclosure may be well understood, there will now be described various forms thereof, given by way of example, reference being made to the accompanying drawings, in which:

FIG. 1 schematically illustrates the thrust reverser device of an aircraft according to the present disclosure, comprising two thrust reversers supplied by the power-conversion module according to a first form;

FIG. 2 illustrates the thrust reverser device according to the present disclosure, the power-conversion module being shown according to a second form; and FIG. 3 illustrates the thrust reverser device according to the present disclosure, the power-conversion module being shown according to a third form.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, illustrating the power management assembly 1 of the thrust reversers of an aircraft, the power-conversion module being shown according to a first form.

Such a power management assembly comprises a power-conversion module 100 supplied at the input by a power source 3 of the aircraft, and connected at the output to two actuators 5 and 5', each being adapted for actuating the cowl of thrust reverser alternately between an opening position and a closing position. Typically, an actuator comprises a power electronic board, for example an inverter, allowing management of the electric motor 6, 6' of each actuator.

The power source 3 delivers three-phase alternating voltage Va, Vb, Vc to the input conductors 7a, 7b and 7c that should be converted into direct voltage.

The power-conversion module 100 comprises two autotransformers 101 and 101', each being connected to the three input conductors 7a to 7c of the power source 3 of the aircraft.

Typically, the autotransformer 101 and 101' each comprise a primary coil and two secondary coils (not shown) phase-shifted in order to reduce the current harmonics on the single power source of the aircraft network.

The primary coil comprises three primary windings, on the one hand connected together, and on the other hand connected to the input conductors 7a, 7b and 7c.

The secondary coil comprises in turn six secondary windings connected to six output conductors 103a to 103f, the conductors 103a, 103b, 103c being connected to a rectifier bridge 105, and the conductors 103d, 103e, 103f being connected to a rectifier bridge 107.

The configurations of the primary and secondary coils may vary according to the needs of the present disclosure. For example, the primary and secondary coils may equally have a star, triangle or mixed configuration, and the secondary coils may be phase-shifted.

The rectifier bridge 105 comprises six diodes 109a to 109f, and delivers a direct voltage between the outputs 111 and 113. The rectifier bridge 107 also comprises six diodes 115a to 115f and delivers a direct voltage between the outputs 117 and 119.

The outputs 111, 113, 117, 119 are connected to an interphase inductor 121 in order to allow the balancing of the rectifier bridges.

The interphase inductor delivers a direct voltage between the outputs 123 and 125.

Similarly to what has been described for the autotransformer 101, the autotransformer 101' is also connected to two rectifier bridges 105' and 107' of same configuration as the rectifier bridges 105 and 107. The rectifier bridges 105' and 107' deliver two direct voltages respectively between the outputs 111' and 113', and 117' and 119', connected to an interphase inductor 121'. The interphase inductor 121' delivers a direct voltage between the outputs 123' and 125'.

The interphase inductors 121 and 121' supply respectively the actuators 5 and 5' of each thrust reverser with direct voltage.

As shown, the direct voltage delivered by the interphase inductor 121 supplies a DC/DC converter 127 which allows reducing the voltage at the output of the inductor in order to supply a single supervisor 129.

For example, the interphase inductor delivers an output voltage of −135 volts/+135 V. The DC/DC converter allows reducing the output voltage to a voltage in the range of 28 volts.

The supervisor 129 allows monitoring and controlling of the actuators of the thrust reversers and the AC/DC converter.

The two output direct voltages 123, 125 and 123', 125' of the power converter 100 supply each actuator 5 and 5' thanks to two contactors or "SSPC" 131, 133, and 131', 133' controlled by a control member of the aircraft.

These contactors allow having a line of defense of power and are controlled by the aircraft.

More specifically, the supervisor receives control orders from the control unit of the electric motor of the actuator and manages the tracking of the trajectory during the opening and the closing of the cowls of the thrust reversers.

The supervisor also sends back to the control unit of the turbojet engine the state of the set comprising the power-conversion module 100, the actuators 5 and 5' of the thrust reverser cowls, and the contactors 131, 133, 131', 133'.

The supervisor 129 transmits the control orders to the actuators 5 and 5' via a field bus 135, 135'.

Referring now to FIG. 2, illustrating the power management assembly 1, the power-conversion module being shown according to a second form.

The power management assembly 1 comprises a power-conversion module 200 comprising two autotransformers 201 and 201'.

The power-conversion module 200 is supplied at the input by the power source 3 of the aircraft and connected at the output to the actuators 5 and 5' of the thrust reversers equipping each nacelle of the turbojet engine of the aircraft.

The power source 3 delivers a three-phase alternating electric voltage Va, Vb, Vc, respectively on the input conductors 7a, 7b and 7c that should be converted into direct voltage.

The autotransformers 201 and 201' comprise each a primary coil and a secondary coil (not represented).

The primary coil comprises three primary windings, on the one hand connected together, and on the other hand connected to the input conductors 7a, 7b and 7c.

Each primary winding respectively receives an alternating voltage V2a, V2b and V2c. The secondary coil comprises in turn three secondary windings connected to three output conductors 203a to 203c connected to a rectifier bridge 205.

The configurations of the primary and secondary coils may vary according to the needs of the present disclosure. For example, the primary and secondary coils may have a star, triangle or mixed configuration, and the secondary coils may be phase-shifted.

The rectifier bridge 205 comprises six diodes 209a to 209f, and delivers a direct voltage between the outputs 211 and 213.

The outputs 211 and 213 are connected to a coupled DC inductor 221 allowing the smoothing of the current of the rectifier bridge.

The coupled DC inductor 221 delivers a direct voltage between the outputs 223 and 225.

Similarly to what has been described for the autotransformer 201, the autotransformer 201' comprises three primary windings each receiving an alternating voltage V'2a, V'2b and V'2c.

The secondary coil comprises three secondary windings connected to the three output conductors 203'a to 203'c connected to a rectifier bridge 205' of same configuration as the rectifier bridge 205 and delivering a direct voltage between the outputs 211' and 213'.

The outputs 211' and 213' are connected to a coupled DC inductor 221' allowing the smoothing of the current of the rectifier bridge.

The coupled DC inductor delivers a direct voltage between the outputs 223' and 225'.

The coupled DC inductors 221 and 221' supply respectively the actuators 5 and 5' of each thrust reverser with direct voltage.

The outputs 203a to 203c are phase-shifted relative to the outputs 203'a to 203'c and adapted for limiting the current harmonics on the power source of the network of the aircraft.

As shown, the DC direct voltage delivered by the coupled DC inductor 221 supplies a DC/DC converter 227 which reduces allows reducing the voltage at the output of the inductor in order to supply a single supervisor 229, the operation of which is similar to that described for the first form. For example, the coupled DC inductor delivers an output voltage of −135 volts/+135 V. The DC/DC converter reduces allows reducing the output voltage to a voltage in the range of 28 volts.

The supervisor 229 allows monitoring and controlling the actuators of the thrust reversers and the AC/DC converter.

The two direct voltages of the outputs 223, 225 and 223', 225' of the power converter 200 supply each actuator 5 and 5' thanks to two contactors or "SSPC" 231, 233, 231', 233'.

These contactors allow having a line of defense of power and are controlled by the aircraft.

As described above, the supervisor receives control orders from the control unit of the electric motor of the actuator and manages the tracking of the trajectory during the opening and the closing of the cowls of the thrust reversers.

The supervisor also sends back to the control unit of the turbojet engine the state of the set comprising the power-conversion module 200, the actuators 5 and 5' of the thrust reverser cowls, and the contactors 231, 233, 231', 233'.

The supervisor 229 transmits the control orders to the actuators 5 and 5' via a field bus 235, 235'.

Referring now to FIG. 3, illustrating the power management assembly 1, the power-conversion module being shown according to a third form, according to which the power-conversion module 300 comprises a single autotransformer 301, of power equal to twice the power of the autotransformers 101, 101', 201 and 201'.

The power-conversion module 300 is supplied at the input by the power source 3 of the aircraft and connected at the output to the actuators 5 and 5' of the thrust reversers equipping each nacelle of turbojet engine of the aircraft.

The power source 3 delivers three-phase alternating voltage Va, Vb, Vc on the input conductors 7a, 7b and 7c that should be converted into direct voltage.

The autotransformer 301 comprises a primary coil and two secondary phase-shifted coils and adapted for reducing the current harmonics on the single power source of the aircraft network (not shown). The primary coil comprises three primary windings, on the one hand connected together, and on the other hand connected to the input conductors 7a, 7b and 7c.

The secondary coil comprises six secondary windings connected to six output conductors 303a to 303f.

The configurations of the primary and secondary coils may vary according to the needs of the present disclosure. For example, the primary and secondary coils may have a star, triangle or mixed configuration, and the secondary coils may be phase-shifted.

The output conductors 303a, 303b, 303c are connected to a rectifier bridge 305, and the output conductors 303d, 303e, 303f are connected to a rectifier bridge 305'.

The rectifier bridges 305 and 305' each comprise respectively 6 diodes 307a to 307f and 307'a to 307'f, and each delivering a direct voltage between the outputs 311 and 313, and 311' and 313'.

The outputs 311 and 313 are connected to a coupled DC inductor 321 and the outputs 311', 313' are connected to a coupled inductor 321', the inductors 321 and 321' allow balancing and smoothing the currents of the rectifier bridges 305 and 305'.

The coupled DC inductors 321 and 321' each deliver a direct voltage between the outputs 323, 325 and 323', 325', respectively supplying the actuators 5 and 5' of each thrust reverser with direct voltage.

As shown, the DC direct voltage delivered by the coupled DC inductor 321 supplies a DC/DC converter 327 which reduces allows reducing the voltage at the output of the inductor in order to supply a single supervisor 329, the operation of which is similar to that described for the first and second forms. The supervisor 329 allows monitoring and controlling of the actuators of the thrust reversers and the AC/DC converter. For example, the coupled inductor delivers an output voltage of −135 volts/+135 V. The DC/DC converter reduces allows reducing the output voltage to a voltage in the range of 28 volts.

The two direct voltages of the outputs 323, 325 and 323', 325' of the power converter 300 supply each actuator 5 and 5' via two contactors or "SSPC" 331, 333, 331', 333'.

These contactors allow having a line of defense of power and are controlled by the aircraft.

As described above, the supervisor receives control orders from the control unit of the electric motor of the actuator and manages the tracking of the trajectory during the opening and the closing of the cowls of the thrust reversers.

The supervisor also sends back to the control unit of the turbojet engine the state of the set comprising the power-conversion module 300, the actuators 5 and 5' of the thrust reverser cowls, and the contactors 331, 333, 331', 333'.

The supervisor 229 transmits the control orders to the actuators 5 and 5' via a field bus 335, 335'.

Thanks to the present disclosure, all of the components necessary to the power conversion are gathered in a single casing. Therefore, a single power source of the aircraft network is necessary for supplying the actuators of the thrust reversers of the aircraft, thereby greatly simplifying the electrical architectures of actuation of the thrust reversers.

The power-conversion modules 200 and 300 of the second and the third forms allow dividing the number of diode bridges by two relative to the first form, thereby reducing the weight of the assembly. Furthermore, the power-conversion module according to the third form presents a reduced weight in that the power-conversion module comprises a single autotransformer.

In addition, the architecture of this present disclosure also allows attenuating the harmonic distortions on the network.

The power-conversion module is positioned within the aircraft fuselage, a particularly advantageous disposition for small aircrafts, when the turbojet engines are integral to the fuselage.

The power management assembly has been described with reference to the power supply of two actuators of thrust reversers. It is however quite possible to adapt the power-conversion module for a higher number of thrust reversers actuators.

In addition, all the description has been made with reference to a power-conversion module comprising a system called "12-pulse" system, that is to say, the power-conversion module comprises 12 diodes per autotransformer. However, the power-conversion module may equally comprise a 18-pulse, 24-pulse system, etc. if the person skilled in the art finds in it a particular benefit.

What is claimed is:

1. A thrust reverser device for an aircraft comprising at least two thrust reversers, each of said thrust reversers comprising at least one cowl movably mounted between a closing position and an opening position, said cowl being actuated by at least one actuator driven by at least one electric motor, said electric motors being electrically supplied by a single power-conversion module electrically supplied by a single power source of said aircraft, the single power-conversion module comprising at least one autotransformer supplied with an alternating electric voltage by the single power source of said aircraft and connected to at least one rectifier stage adapted for converting said alternating electric voltage into a direct voltage, said rectifier stage being connected to at least one of a current balancing stage and a current smoothing stage, adapted for supplying with the direct voltage said electric motor of said electric actuator of said cowl, wherein the single power-conversion module comprises one of:

two autotransformers being supplied with alternating voltage by said single power source of said aircraft, each of said autotransformers comprising phase-shifted outputs and connected to at least two rectifier circuits, each of said rectifier circuits of a same autotransformer being connected to a single interphase inductor configured to balance currents and deliver a direct voltage supplying at least one electric motor of an actuator of said cowl, two autotransformers supplied with alternating electric voltage by said single power source of said aircraft, and each of said autotransformers comprising phase-shifted outputs and connected to at least one rectifier circuit, each of said rectifier circuits of a same autotransformer being connected to a coupled DC inductor adapted for smoothing a current and delivering a direct voltage supplying at least one electric motor of the actuator of said cowl, and a single autotransformer supplied with alternating electric voltage by said single power source of said aircraft, said autotransformer comprising two phase-shifted outputs connected to at least two rectifier circuits, each of said rectifier circuits being connected to a coupled DC inductor adapted for smoothing current and delivering the direct voltage supplying at least one electric motor of the actuator of said cowl.

2. The thrust reverser device according to claim 1, wherein the direct voltage delivered by the interphase inductor supplies a DC/DC converter configured to reduce the direct voltage at an output of the interphase inductor.

3. The thrust reverser device according to claim 1, wherein the direct voltage delivered by the coupled DC inductor supplies a DC/DC converter configured to reduce the direct voltage at an output of the inductor.

4. The thrust reverser device according to claim 1, wherein the rectifier circuits of the single power-conversion module comprises a diode bridge comprising at least six diodes.

5. The thrust reverser device according to claim 1, wherein the single power-conversion module further comprises at least one supervisor configured to monitor and control the actuators of the cowls of said thrust reversers, said supervisor being supplied with the direct voltage by said interphase inductor.

6. The thrust reverser device according to claim 1, wherein the single power-conversion module further comprises at least one supervisor configured to monitor and control the actuators of the cowls of said thrust reversers, said supervisor being supplied with the direct voltage by said coupled DC inductor.

* * * * *